United States Patent [19]

Ishikawa

[11] Patent Number: 4,796,965
[45] Date of Patent: Jan. 10, 1989

[54] OPTICAL SCANNING DEVICE
[75] Inventor: Hiromi Ishikawa, Kaisei, Japan
[73] Assignee: Fuji Photo Film Co., Ltd., Minamiashigara, Japan
[21] Appl. No.: 747,185
[22] Filed: Jun. 21, 1985
[30] Foreign Application Priority Data
Jun. 22, 1984 [JP] Japan ................... 59-127322
[51] Int. Cl.⁴ ............................................. G02B 26/10
[52] U.S. Cl. ....................................... 350/6.8; 350/6.5
[58] Field of Search ............... 350/6.5, 6.7, 6.8, 380, 350/401, 6.6; 250/235, 236, 234

[56]        References Cited
         U.S. PATENT DOCUMENTS

| | | | |
|---|---|---|---|
| 3,897,132 | 7/1975 | Meeussen et al. | 350/6.7 |
| 4,312,590 | 1/1982 | Harbaugh | 350/6.7 |
| 4,429,948 | 2/1984 | Garwin | 350/6.8 |
| 4,433,894 | 2/1984 | Hanson et al. | 350/6.8 |
| 4,564,931 | 1/1986 | O'Hara et al. | 350/401 |
| 4,624,528 | 11/1986 | Brueggemann | 350/6.7 |
| 4,682,842 | 7/1987 | Brueggemann | 350/6.7 |

FOREIGN PATENT DOCUMENTS 2053505  2/1981  United Kingdom ............... 350/6.6

Primary Examiner—John K. Corbin
Assistant Examiner—Loha Ben
Attorney, Agent, or Firm—Fleit, Jacobson, Cohn & Price

[57]        ABSTRACT

An optical scanning device comprises a mechanical type optical deflector provided with a deflecting reflecting surface which is rotated or swivelled, and two flat correction mirrors arranged so that the line of intersection of the two mirrors is perpendicular to the axis of rotation of the optical deflector. The incident light beam deflected by the deflecting reflecting surface goes to one of the two plane correction mirrors, then the other, which reflects it back to the deflecting reflecting surface, whence it goes as the scanning beam to the scanning surface. The arrangement of the correction mirrors, deflecting reflector and incident beam is such that that scanning line distortion such as caused by component misalignment and the like can be reduced to negligible proportions.

5 Claims, 4 Drawing Sheets

OPTICAL SCANNING DEVICE

BACKGROUND OF THE INVENTION

1. Field of the Invention

This invention relates to an optical scanning device wherein two plane correction mirrors are used to optically correct scanning line distortion caused by misalignment of the deflecting reflecting surface of a mechanical type optical deflector such as a multifaceted rotating mirror.

2. Description of the Prior Art

Optical scanning devices which employ mechanical optical deflectors such as multifaceted rotating mirrors, galvanometer mirrors, or bimorph mirrors are widely used. With such optical deflectors, the deflecting reflecting surface is rotated or swivelled about its axis, but there have been problems such as that the precision with which the deflecting reflector is fixed with reference to the axis, and the precision of fabrication of the surface of the deflecting reflector, has been poor, causing misalignment of the deflecting reflecting surface, deviation of the axis itself, and the like, causing distortion of the scanning lines. When an optical scanning apparatus is being used for recording or read-out of image information, such distortion of the scanning lines greatly reduces the precision of the image information recording or read-out.

There has been proposed a number of methods for eliminating this scanning line distortion. In one such method a correctional optical deflector such as an acousto-optical modulator is interposed in the light beam used for scanning (Japanese Laid-open Patent Application Nos. 47-33642, 53-146643, and 53-111745). However, a problem with this method has been the complexity of the system for controlling the correctional optical deflector.

Another proposal has been to use a pair of anamorphic optical systems whereby the scanning light beam is reflected by the deflecting reflector as a line image parallel to the direction of rotation of the deflecting reflector and scans again as a light spot (Japanese Patent Publication No. 28666/1977). However, a problem with this has been that the optics is complex and adjustment is difficult.

In another proposal (U.S. Pat. No. 3897132), two plane correction mirrors which intersect each other are arranged so that the line of intersection is at right-angles to the axis of rotation of the deflecting reflecting surface, and the light beam reflected by the deflecting reflector is returned to the deflecting reflecting surface by these plane mirrors, so as to have it reflected twice by the deflecting reflector. However, with this method, if the incident light beam and the scanning light beam going to the scanning surface are not both at right-angles to the axis of rotation of the deflecting reflecting surface, the scanning beam distorts into a curve. When the incident light beam is not at right-angles to the axis of rotation of the deflecting reflecting surface, the first reflection from the deflecting reflecting surface produces a curvature in the reflected light beam, and curvature is again produced in the light beam when it is returned to the deflecting reflecting surface by the pair of plane correction mirrors and reflected a second time, so the end result is that the scanning lines retain a large curvature.

SUMMARY OF THE INVENTION

The primary object of this invention is therefore to provide an optical scanning device employing two correction plane mirrors whereby it is possible to correct scanning line distortion caused by surface misalignment and to reduce curving of the scanning lines to a level where it does not constitute any problem in practice.

In order to achieve this objective, the optical scanning device according to this invention comprises a mechanical type optical deflector provided with a deflecting reflecting surface which can be rotated or swivelled about an axis of rotation, and two flat correction mirrors disposed in opposition to said deflecting reflecting surface with the line of intersection of the two mirrors at right-angles to said axis of rotation, whereby the incident light beam which falls on the deflecting reflecting surface is reciprocated once between the two plane correction mirrors and the deflecting reflecting surface and then directed to the scanning surface, characterized by the disposition of the two plane correction mirrors and the angle of incidence of the light beam being set so that the image of the scanning light beam projected towards the plane which is at right-angles to the line of intersection of the two correction mirrors and contains said axis of rotation forms an angle of 5°–15° with the plane which is at right-angles to said axis of rotation.

DESCRIPTION OF THE PREFERRED EMBODIMENTS

Figure 1:
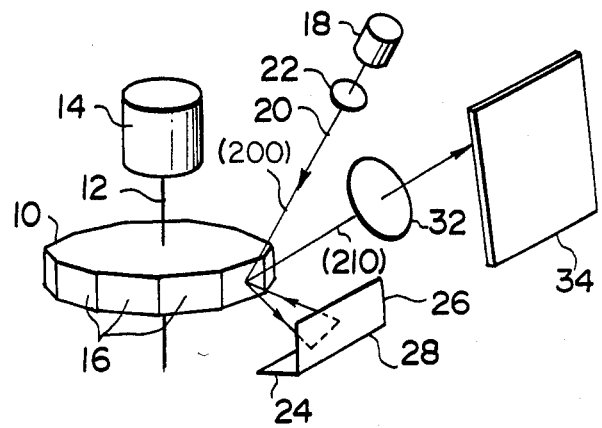
FIG. 1 is a perspective view of one embodiment of the present invention.
Figure 2:
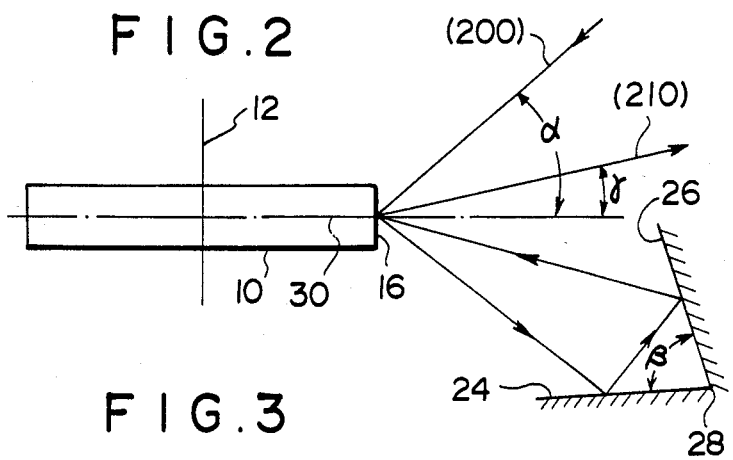
FIG. 2 shows a side view of the optical path of the light beam.
Figure 10:
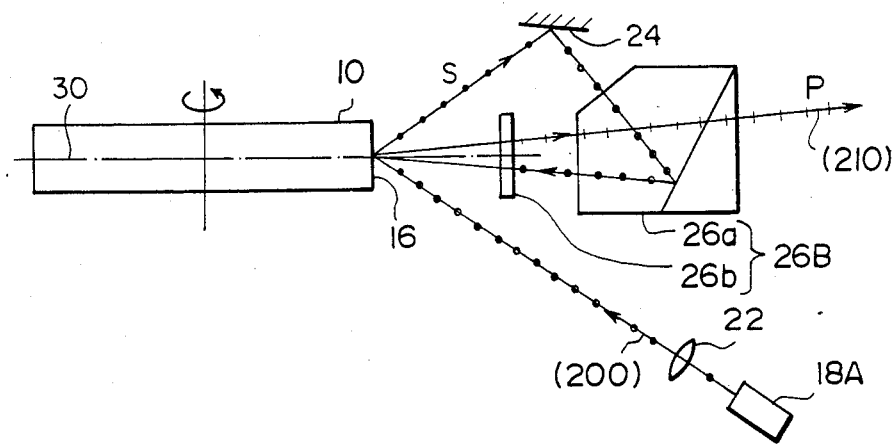
FIG. 10 is a side view of yet another embodiment of the present invention.

With reference to FIGS. 1 and 2, 10 is a multifaceted rotating mirror which acts as a light deflector and is rotated about axis 12 by a drive motor 14. The periphery of the multifaceted rotating mirror 10 is formed into a deflecting reflecting surface 16 which consists of a plurality of plane mirrors. A light beam 20 emitted from a light source 18 is directed to the deflecting reflecting surface 16 by an optical system 22.

Numerals 24 and 26 indicate plane mirrors used for correction. The line 28 where these plane mirrors 24, 26 join is at right-angles to the axis of rotation 12. In this embodiment, as shown in FIG. 2, these plane mirrors 24, 26 are at right-angles to the axis of rotation 12 and are also on one side relative to a plane 30 which passes through the central part of deflecting reflecting surface 16 at right-angles to the axis of rotation 12, being located on the side of the plane 30 opposite to that of incident light beam (200) and scanning light beam (210). The light beam reflected by the deflecting reflecting surface 16 is reflected once by each of the plane mirrors 24, 26, returns to the deflecting reflecting surface 16 to be again reflected by the deflecting reflecting surface 16 and form the scanning light beam (210). The position of plane mirrors 24, 26 and angle β are set so that the first reflection point and the second reflection point on the deflecting reflecting surface 16 are located on a single line of intersection of the plane 30 with deflecting reflecting surface 16. This enables the multifaceted rotating mirror 10 to be made thinner and also reduces the effect of axial misalignment of deflecting reflecting surface 16.

Numeral 32 shows an $f_\theta$ lens and 34 is the scanning surface.

Here, with reference to FIG. 2, α is the angle formed by the incident light beam (200) and γ is the angle formed by the scanning light beam (210), relative to the plane 30 which is at right-angles to the axis of rotation.

Figure 3:
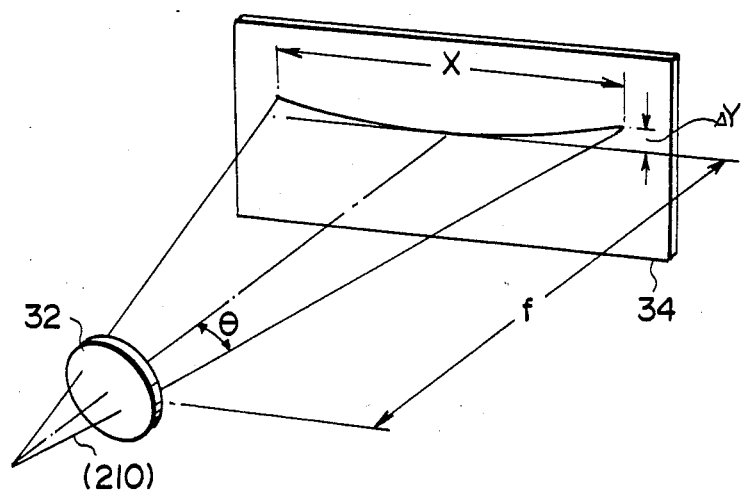
FIG. 3 is a perspective view showing the bowing of the scanning line.
Figure 4:
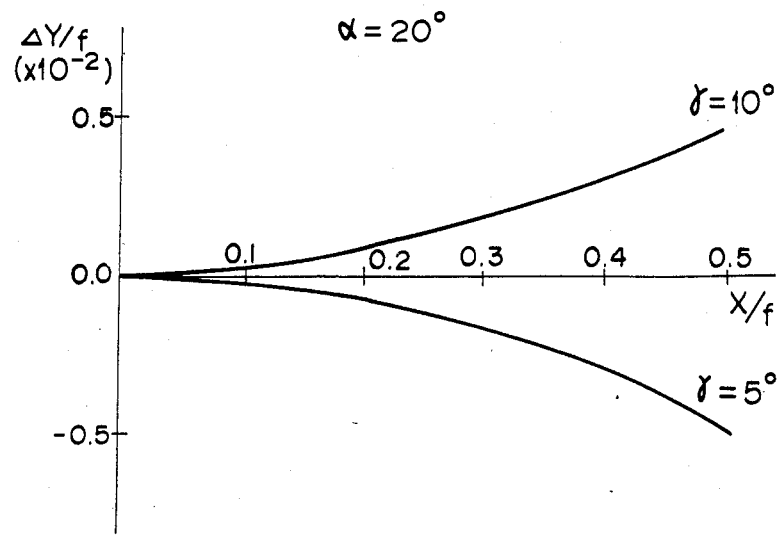
FIGS. 4 to 7 show the relationship between scanning position and distortion for different angles of incidence α.
Figure 5:
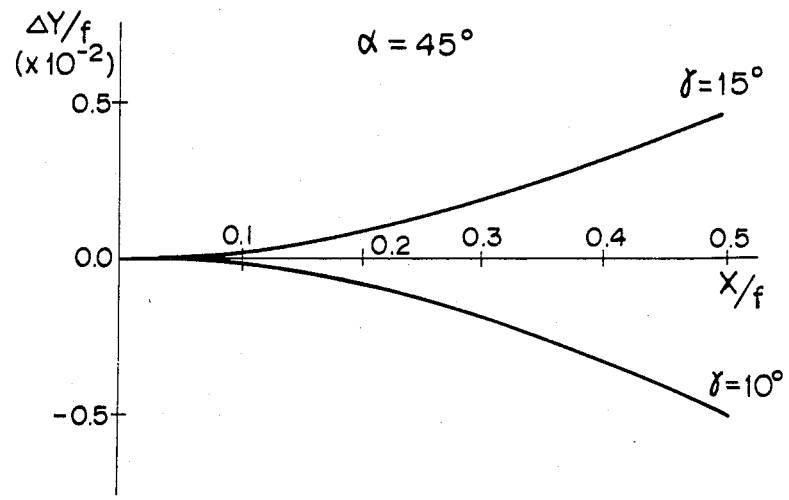
Figure 6:
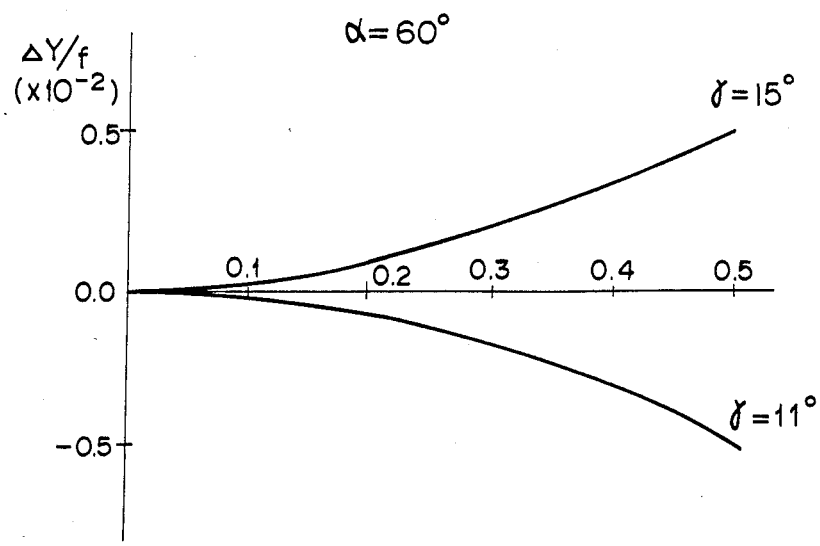
Figure 7:
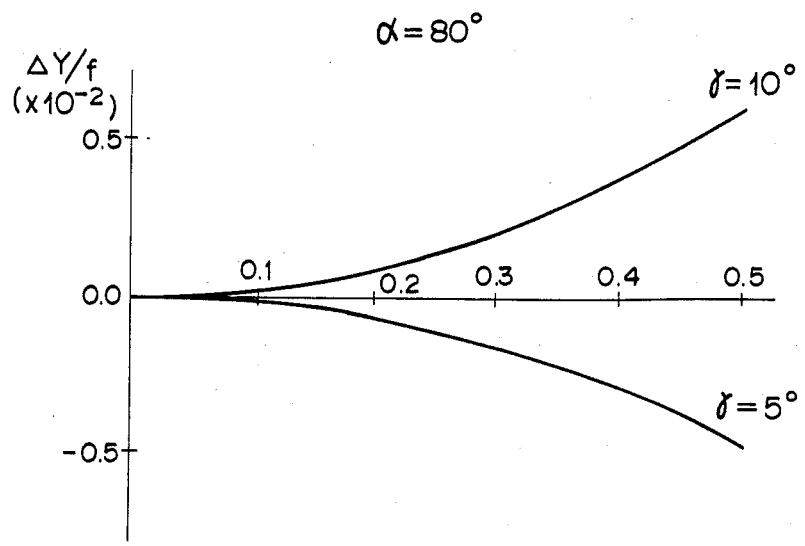

These angles α, β are the angles formed relative to the plane (drawing sheet of FIG. 2) which contains the axis of rotation 12 by the incident light beam (200) and by the projected image of the scanning light beam (210) relative to the plane 30. Also, f is the focal distance of the $f_\theta$ lens, X the length of the scanning lines, and ΔY the maximum deflection of the scanning line in the secondary scanning direction (FIG. 3).

In general, the allowable limit of scanning line bowing distortion required of an optical scanning apparatus is $$|\Delta Y/f| \leq 0.005 \quad (1).$$

Also, the scanning line length X normally used is $$|X/f| \leq 0.5 \quad (2).$$

If for example an $f_\theta$ lens 32 is used in which f=600 mm, then X=300 mm and distortion is ΔY=3 mm. Taking into consideration that the angle of incidence α of the incident light beam (200) is usually within the limits $$20° \leq \alpha \leq 80° \quad (3),$$

the present inventors obtained a scanning light beam (210) angle of reflection γ which is within the limits of (1) under the conditions of (2) and (3). The results are shown in FIGS. 4 to 7, which illustrate the distortion (ΔY/f) of the scanning position (X/f) for angles of incidence α of 20°, 45°, 60°, and 80°. These results are shown in tabular form in the following table.

| Angle of Incidence α | Angle of Projection γ |
| --- | --- |
| 20° | 5°–10° |
| 45° | 10°–15° |
| 60° | 11°–15° |
| 80° | 5°–10° |

From the above results, it is clear that if the angle of reflection of the scanning beam (210) is 5°≦γ≦15°, under normal conditions of use, distortion of the scanning line can be kept to within the allowable limits.

Figure 8:
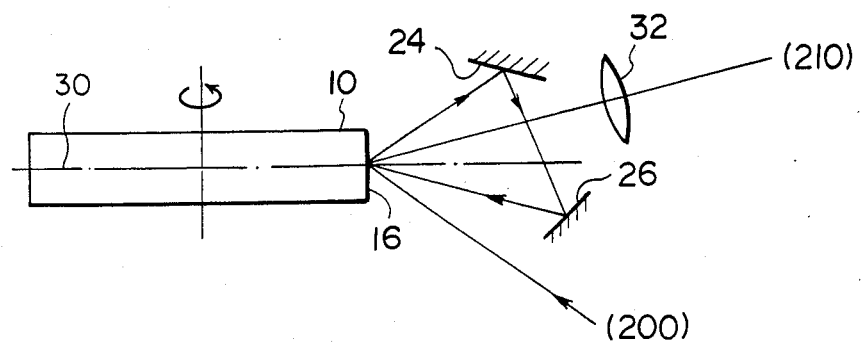
FIG. 8 is a side view of another embodiment of the present invention.

With reference to FIG. 8, which shows another embodiment of the present invention, the plane correction mirrors 24, 26 are provided one on each side of the plane 30 and the scanning light beam (210) is guided between said mirrors 24, 26 to the scanning surface.

Figure 9:
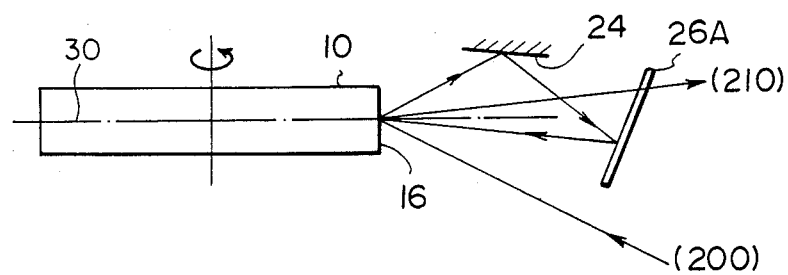
FIG. 9 is a side view of yet another embodiment of the present invention.

In a further embodiment, shown in FIG. 9, one of the plane correction mirrors is a semi-transparent mirror 26A; in this embodiment a portion of the scanning light beam (210) is guided to the scanning surface through said mirror 26A. As a result, the reflection angle γ of the scanning light beam (210) can be made smaller, compared with that of the other embodiments (see FIGS. 1, 2, and 8).

In a further embodiment, illustrated in FIG. 10, a laser light source 18A, such as a semiconductor laser, is employed which emits a beam of linear polarized light, and which is oriented so the beam falling onto the deflecting reflecting surface 16 provides a deflection S. The plane correction mirror 26B consists of a polarized light beam-splitter 26a and a λ/4 plate 26b interposed between said beam-splitter 26a and the deflecting reflecting surface 16. Thus, the S deflected incident light beam (200) is reflected by the deflecting reflecting surface 16, the plane mirror 24 and also by the polarized light beam splitter 26a, and passes through λ/4 plate 26b to become circular polarized light. The circular polarized light is again reflected by deflecting reflecting surface 16 and passes through λ/4 plate 26b to become P polarized light with a polarity that has been changed by 90° relative to the incident light beam (200), and is then passed through the polarized light beam-splitter 26a and is projected as P polarity scanning light beam (210). Compared with the embodiment of FIG. 9, this embodiment employs the light beam more efficiently, because it is possible to utilize all of the light of the incident light beam (200) for the scanning beam (210).

In the above embodiments a multifaceted rotating mirror 10 is used as the optical deflector, but it is also possible to employ a galvanometer mirror or bimorph mirror or the like in this invention.

Also, as stated, if the first and second reflection points on the deflecting reflecting surface 16 are located on a line of intersection between the plane 30 and the deflecting reflecting surface 16, the optical deflector can be made more compact and less subject to the effect of misalignment of the deflecting reflecting surface 16, but the desired object can also be achieved if the plane correction mirrors are positioned so the two reflection points on the deflecting reflecting surface 16 are separated along the direction of the axis of rotation 12.

As has been described in the foregoing, if two plane correction mirrors are arranged so that the angle γ formed between a plane that is at right-angles to the line of intersection of the two plane correction mirrors and which includes the axis of rotation of the scanning light beam, falls within 5°–15°, bowing distortion of the scanning lines can be held to within a range where it does not constitute a problem. In addition, as two plane correction mirrors are used and the light beam is shuttled once between these mirrors and the deflecting surface, it is therefore possible to correct scanning line distortion caused by misalignment of the deflecting reflecting surface or by axial deviation.

I claim:

1. An optical scanning device for reducing scanning line distortion, said device comprising: a mechanical type optical deflector provided with a deflecting reflecting surface which can be used about an axis of rotation, said deflecting reflecting surface being planar and extending in a direction substantially parallel to said axis of rotation, light source means for providing a light beam incident on said deflecting reflecting surface at a first reflection point to provide a reflected light beam, two plane correction mirrors positioned at an angle to each other to define a line of intersection, said plane correction mirrors being positioned to receive said reflected light beam from said first reflection point and to direct the beam to the deflecting reflecting surface at a second reflection point, said plane correction mirrors being disposed in opposition to said deflecting reflecting surface with the line of intersection of the two mirrors extending at a right angle to said axis of rotation, scanning surface means for receiving a scanning light beam from said second reflection point of said deflecting reflecting surface, wherein the incident light beam which falls on the deflecting reflecting surface is reciprocated once between the two plane correction mirrors and the deflecting reflecting surface and is then directed and transmitted to the scanning surface means, said light source means being located on one side of the transmitted scanning light beam and said two plane correction mirrors both being located on an opposite side of the transmitted scanning light beam, and said two plane correction mirrors and the angle of incidence of the light beam from said light source means incident on said deflecting reflecting surface being set so that the projection of the scanning light beam from said second reflection point projected on a plane which is at right-angles to the line of intersection of the two correction mirrors and contains said axis of rotation, forms an angle of from about 5° to about 15° with a line lying in said plane and perpendicular to said axis of rotation.

2. An optical scanning device for reducing scanning line distortion, said device comprising: a mechanical type optical deflector provided with a deflecting reflecting surface which can be turned about an axis of rotation, said deflecting reflecting surface being planar and extending in a direction substantially parallel to said axis of rotation, light source means for providing a light beam incident on said deflecting reflecting surface at a first reflection point to provide a reflected light beam, two plane correction mirrors positioned at an angle to each other to define a line of intersection, said plane correction mirrors being positioned to receive said reflected light beam from said first reflection point and to direct the beam to the deflecting reflecting surface at a second reflection point, said plane correction mirrors being disposed in opposition to said deflecting reflecting surface with the line of intersection of the two mirrors extending at a right angle to said axis of rotation, scanning surface means for receiving a scanning light beam from said second reflection point of said deflecting reflecting surface, wherein the incident light beam which falls on the deflecting reflecting surface is reciprocated once between the two plane correction mirrors and the deflecting reflecting surface and is then directed and transmitted to the scanning surface means, one of said two plane correction mirrors including a semitransparent mirror through which the scanning light beam passes from said second reflection point of said deflecting reflecting surface to said scanning surface means, and said two plane correction mirrors and the angle of incidence of the light beam from said light source means incident on said deflecting reflecting surface being set so that the projection of the scanning light beam from said second reflection point projected on a plane which is at right-angles to the line of intersection of the two correction mirrors and contains said axis of rotation, forms an angle of from about 5° to about 15° with a line lying in said plane and perpendicular to said axis of rotation.

3. An optical scanning device for reducing scanning line distortion, said device comprising: a mechanical type optical deflector provided with a deflecting reflecting surface which can be turned about an axis of rotation, said deflecting reflecting surface being planar and extending in a direction substantially parallel to said axis of rotation, light source means for providing a linearly polarized light beam incident on said deflecting reflecting surface at a first reflection point to provide a reflected light beam, two plane correction mirrors positioned at an angle to each other to define a line of intersection, said plane correction mirrors being positioned to receive said reflected light beam from said first reflection point and to direct the beam to the deflecting reflecting surface at a second reflection point, said plane correction mirrors being disposed in opposition to said deflecting reflecting surface with the line of intersection of the two mirrors extending at a right angle to said axis of rotation, scanning surface means for receiving a scanning light beam from said second reflection point of said deflecting reflecting surface, wherein the incident light beam which falls on the deflecting reflecting surface is reciprocated once between the two plane correction mirrors and the deflecting reflecting surface and is then directed and transmitted to the scanning surface means, one of said two plane correction mirrors including a polarizing light beam-splitter and a $\lambda/4$ plate interposed between said polarizing light beam-splitter and the deflecting reflecting surface, the other of said mirrors reflecting the reflected linearly polarized light beam from the first reflection point on the deflecting reflecting surface to said polarizing light beam-splitter, said polarizing light beam-splitter directing the reflected linearly polarized light beam through said $\lambda/4$ plate to the second reflection point on the deflecting reflecting surface, with said reflected linearly polarized light beam passing back through said $\lambda/4$ plate and then through said polarizing light beam-splitter before it impinges on the scanning surface means, and said two plane correction mirrors and the angle of incidence of the light beam from said light source means incident on said deflecting reflecting surface being set so that the projection of the scanning light beam from said second reflection point projected on a plane which is at right-angles to the line of intersection of the two correction mirrors and contains said axis of rotation, forms an angle of from about 5° to about 15° with a line lying in said plane and perpendicular to said axis of rotation.

4. An optical scanning device for reducing scanning line distortion, said device comprising: a mechanical type optical deflector provided with a deflecting reflecting surface which can be turned about an axis of rotation, said deflecting reflecting surface being planar and extending in a direction substantially parallel to said axis of rotation, light source means for providing a light beam incident on said deflecting reflecting surface at a first reflection point to provide a reflected light beam, two plane correction mirrors positioned at an angle to each other to define a line of intersection, said plane correction mirrors being positioned to receive said reflected light beam from said first reflection point and to direct the beam to the deflecting reflecting surface at a second reflection point, said plane correction mirrors being disposed in opposition to said deflecting reflecting surface with the line of intersection of the two mirrors extending at a right angle to said axis of rotation, scanning surface means for receiving a scanning light beam from said second reflection point of said deflecting reflecting surface, wherein the incident light beam which falls on the deflecting reflecting surface is reciprocated once between the two plane correction mirrors and the deflecting reflecting surface and is then directed and transmitted to the scanning surface means, said light source means being located on one side of the transmitted scanning light beam and said two plane correction mirrors both being located on an opposite side of the transmitted scanning light beam, said two plane correction mirrors and the angle of incidence of the light beam from said light source means incident on said deflecting reflecting surface being set so that the projection of the scanning light beam from said second reflection point projected on a first plane which is at right-angles to the line of intersection of the two correction mirrors and contains said axis of rotation, forms an angle of from about 5° to about 15° with a line lying in said first plane and perpendicular to said axis of rotation, and said first reflection point and said second reflection point defining a reflection point line on said deflecting reflecting surface, said reflection point line extending parallel to a second plane which is perpendicular to the axis of rotation.

5. An optical scanning device according to claim 4, wherein said light source is located on one side of said second plane which is at right-angles to the axis of rotation, and said two plane correction mirrors both are located on an opposite side of said second plane.

* * * * *